UNITED STATES PATENT OFFICE.

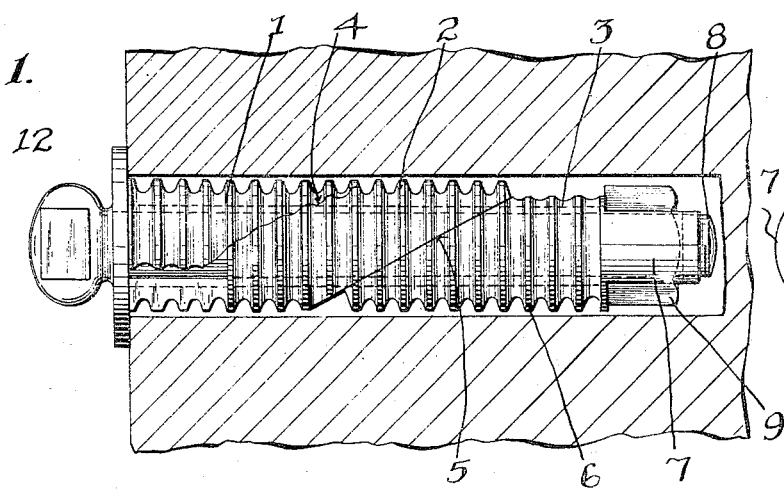
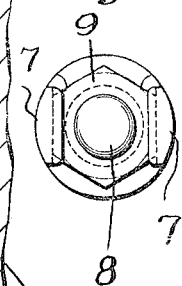
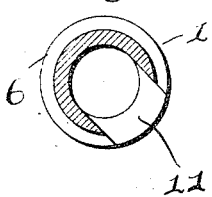
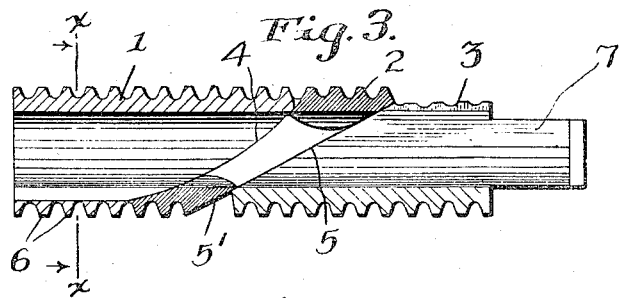
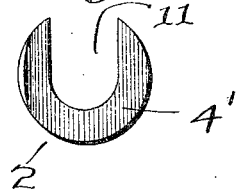
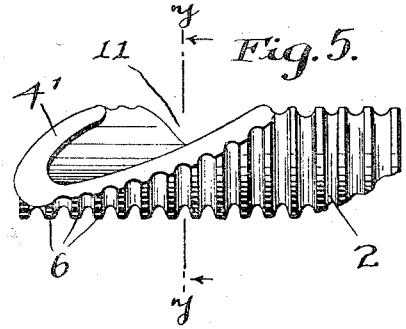
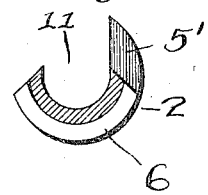
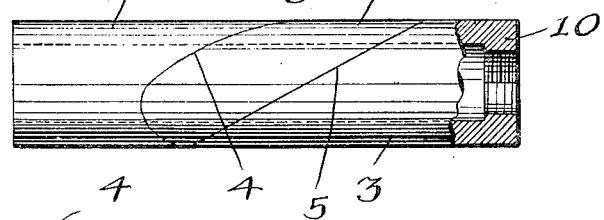
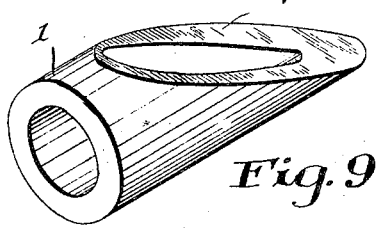

GEORGE CHAUNCEY PARSONS, OF NEWARK, NEW JERSEY.

EXPANSION-BOLT.

1,316,640.  Specification of Letters Patent.  Patented Sept. 23, 1919.

Application filed April 29, 1918. Serial No. 231,330.

*To all whom it may concern:*

Be it known that I, GEORGE CHAUNCEY PARSONS, a citizen of the United States, and a resident of the city of Newark, in the county of Essex and State of New Jersey, have invented certain new and useful Improvements in Expansion-Bolts, of which the following is a specification.

My invention relates to improvements in expansion bolts.

One of the objects of my invention is to provide an expansion bolt of simple and inexpensive construction.

Another object is to provide an expansion bolt in which the longitudinal contraction of the bolt will cause the expansion members to move laterally in three or more different directions, the sum of these movements giving a circumferential expansion whereby the expansion bolt can be rigidly anchored in the recess in which it is placed.

Other objects of my invention will appear from the drawings and the detailed description to follow.

Referring to the drawings,

Figure 1 is a view of my expansion bolt inserted in a recess in a wall.

Fig. 2 is an end view of the expansion bolt.

Fig. 3 is a sectional view of the expansion members or shell.

Fig. 4 is a sectional view taken on the line $x$—$x$ of Fig. 3.

Fig. 5 is a side view of one of the expansion members.

Fig. 6 is an end view of the expansion member shown in Fig. 5.

Fig. 7 is a sectional view taken on the line $y$—$y$ of Fig. 5.

Fig. 8 is a side view partly in section of a modified form of expansion members or shell.

Fig. 9 is a view in perspective of one of the expansion members of the shell shown in Fig. 8.

As shown, my improved expansion bolt comprises a plurality of hollow wall-engaging members, constituting a sectional expansion shell, and a bolt adapted to be passed therethrough and to be utilized as a contracting member so as to cause the wall-engaging members to move longitudinally and laterally to produce a circumferential expansion of the shell. These wall-engaging members are so constructed and arranged that a longitudinal contraction will cause said members to move laterally in three or more different directions, giving a positive circumferential expansion of the shell.

In the preferred embodiment of my invention, the shell comprises three wall-engaging members or sections, two end sections and an intermediate section, which when assembled will form a hollow shell, the bore of which should be larger than the bolt which it receives so as to permit of sufficient lateral movement of the members.

The ends of the wall-engaging members or sections which are adapted to contact with each other are truncated or beveled, each of these bevels being a portion of the surface of a plane. The planes of all of the bevels preferably make equal angles with the longitudinal axis but the plane of the pair of contacting bevels of the inner end section and the middle section is twisted about the axis through an angle of 60° relative to the plane of the contacting bevels of the outer end section and the middle section. The outward normals of the two plane bevels of the middle section drawn from the points of intersection of the axis with these planes, hereinafter referred to simply as the normals, make an angle of 120° with each other as viewed axially. That is, these normals would appear as radial lines 120° apart when viewed in an axial direction, these radial lines in reality being the projections of the normals upon a plane perpendicular to this axis. Consequently the two end sections when moved axially toward each other would also move in the directions of the normals to the planes of intersection with the middle section, the radial components of these motions being 120° apart. The middle section would move radially in the direction of the resultant of the two inward directed normals to planes of its bevels which direction would be 120° from the radial direction of motion of either of the end sections.

As shown in the drawings, the wall-engaging members or shell of my expansion bolt comprises the end sections 1 and 3, and the intermediate section 2. The bevel face of section 1 is shown at 4; the bevel face of section 3 is shown at 5; and the bevel end faces of the intermediate section 2 are shown at 4' and 5'. It is accordingly apparent that when the sections 1, 2 and 3 are assembled, they will form a hollow shell and constitute the wall-engaging members of the device.

In the preferred form of my invention, the outer surfaces of the sections 1, 2 and 3 are provided with a plurality of transverse ribs or corrugations 6, 6, so that as the device is expanded the ribs or corrugations will present many points of contact to the walls of the recess in which the expansion bolt is placed. These ribs or corrugations, however, are optional for the outer surfaces of the expansion members or sections may be smooth, as shown in Figs. 8 and 9.

In Figs. 1 and 3 I show the end section 3 provided with extensions 7, so that when the bolt 8 is passed through the expansion members, these extensions 7 will act as a stop against the rotation of a nut 9 relatively to the end section 3 this nut being placed on the end of the bolt 8.

If preferred, the end sections 3 may be made with a solid end 10 (as shown in Fig. 8) which can be tapped and threaded to receive the threaded end of the bolt 8.

As the expansion members or shells of expansion bolts are usually cast from malleable iron or other suitable material, the sections 1, 2 and 3 may be made with one side open so as to avoid the use of a core in casting the same, thus making the sections substantially U-shaped in cross-section. These openings 11 in the sections are shown in Figs. 4, 5, 6 and 7, and in order to permit the pattern to be withdrawn from the same, the opening 11 should be slightly larger than the internal diameter of the shell.

When it is desired to utilize my device in a recess in a wall, as shown in Fig. 1, the sections 1, 2 and 3 are assembled on the bolt 8 and the nut 9 is then screwed on the threaded end of the bolt so that the nut will engage and be held against rotation by the extensions 7. If the head 12 of the bolt 8 be then rotated, the nut 9 will move toward the head 12, which will cause the end sections to move longitudinally toward each other. Simultaneously with this longitudinal movement, the end sections will be forced laterally in different directions by reason of their bevel faces engaging the bevel faces of the intermediate section, the intermediate section thus acting as a wedge member. As the bevel faces of the intermediate section are non-parallel, a compound lateral movement will be imparted to the intermediate section. The longitudinal contraction of the shell will, therefore, produce a circumferential expansion whereby the sections will forcibly engage the walls of the recess in which the bolt is placed.

I do not, however, wish to be limited to three sectional members, for it is apparent that an expansion member of any length can be secured by increasing the number of intermediate sections.

Nor do I wish to be limited to the precise construction and arrangement of the parts as shown in the drawings, for it is apparent that changes may be made therein without, however, departing from the spirit and scope of my invention, as defined by the appended claims.

I claim—

1. In an expansion bolt, a sectional expansion shell comprising a plurality of wall-engaging members substantially U-shape in cross-section, one of said members acting as a wedge to force the other members contacting therewith in laterally different directions as said contacting members approach each other.

2. An expansion bolt comprising, in combination, a threaded bolt, a nut therefor, and three wall-engaging expansion members substantially U-shape in cross-section, one of said members having one of its ends beveled, another member having both ends beveled in different directions, and the third member having one of its ends beveled and its other end provided with means for preventing the rotation of said nut.

3. In an expansion bolt, the combination with an intermediate hollow wall-engaging section having beveled ends, the planes of which making equal angles with the axis are twisted relatively to each other about the axis at an angle other than 180°, of two hollow wall-engaging end sections, one end of each section being beveled, and means for causing said sections to move laterally.

4. In an expansion bolt, the combination of a threaded bolt, and a plurality of hollow cylindrical members constituting a cylindrical shell, all contacting ends of the members being beveled and making equal angles with the longitudinal axis but alternate contacting surfaces being twisted relative to each other to an angle other than 180°.

5. In an expansion bolt, the combination of a sectional hollow expansion shell comprising two end sections, one end of each section being beveled, and a wedge member intermediate said two end sections, said wedge member having its ends beveled in planes making the same angle with the axis but twisted relatively to each other about the axis at an angle other than 180°, and means for producing a longitudinal and lateral movement of said sections.

6. An expansion bolt comprising, in combination, a threaded bolt, and a sectional expansion shell adapted to receive said bolt, said shell comprising two end sections, each having beveled ends, and an intermediate section having its ends beveled, the planes of said bevels making equal angles with the axis, but rotated relatively to each other about the axis, and means in one of said end sections for receiving and engaging the threaded end of said bolt.

7. In an expansion bolt, a sectional expansion shell, comprising three wall-engaging members having transverse corrugations on their outer surfaces, the adjacent ends of two non-contiguous members being beveled to make equal angles with the axis of said shell but twisted relatively to each other about the axis at an angle other than 180°.

8. An expansion bolt, comprising, in combination, a sectional expansion shell, comprising two end sections, each having a beveled end, and an intermediate section having both ends beveled, the planes of said bevels being rotated relatively to each other about the axis, and means for producing lateral movements to all of said sections, each section moving in a different direction from the other two.

9. In an expansion bolt, a sectional expansion shell comprising three wall-engaging sections, one of said sections acting as a wedge and the other two sections contacting therewith, whereby as the two last named sections approach each other, all three sections will move laterally in different radial directions.

10. In an expansion bolt, the combination with a plurality of wall-engaging expansion members, of means whereby as two of the members approach each other all members will move with respect to each other laterally in different radial directions substantially uniformly spaced circumferentially.

11. In an expansion bolt, the combination of a sectional expansion shell comprising a wedge-shaped wall-engaging member and other wall-engaging members contacting therewith, the planes of said contacting surfaces making the same angles with the axis but twisted relatively to each other about the axis at an angle other than 180°, and tension means for drawing said members together.

This specification signed and witnessed this 27th day of April, A. D., 1918.

GEORGE CHAUNCEY PARSONS.

Signed in the presence of—
 EDWIN A. PACKARD,
 G. M. McGRANN.